United States Patent Office 2,960,888
Patented Nov. 22, 1960

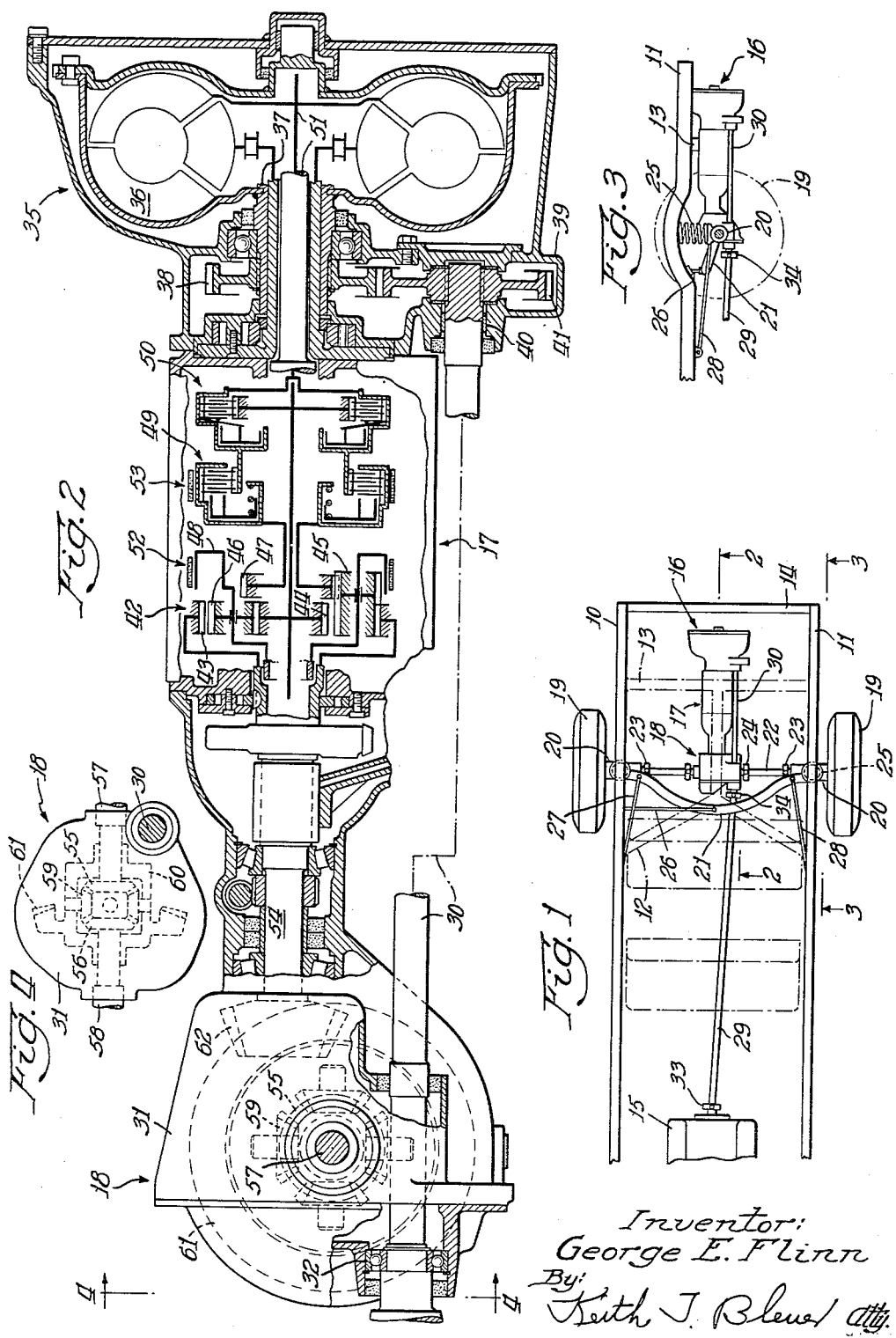

2,960,888

REAR MOUNTED TRANSMISSION

George E. Flinn, Muncie, Ind., assignor to Borg-Warner Corporation, Chicago, Ill., a corporation of Illinois Filed Feb. 21, 1958, Ser. No. 716,692

1 Claim. (Cl. 74—700)

My invention relates to automotive vehicles and in particular to driving mechanisms in such vehicles connecting the driving engine of the vehicle with the rear driving road wheels.

It is a common practice in vehicles presently being manufactured to position the multi-speed transmission directly behind the vehicle engine located in the front of the vehicle, the transmission being connected by means of a propeller shaft with the differential for driving the rear road wheels. The transmissions are generally quite bulky necessitating a sizable upwardly extending hump in the floor of the forward passenger compartment.

It is an object of the present invention to relocate the transmission in such a vehicle at the rear of the vehicle, so that no such transmission hump is required.

More particularly, it is an object of the invention to locate the transmission at the rear of the differential and to connect the differential and transmission rigidly together.

It is another object of the invention to provide a rear propeller shaft section extending alongside the transmission to an intermediate point thereof and to drivingly couple the rear end of this propeller shaft section to the remainder of transmission by means of gearing. It is contemplated that another propeller shaft section shall be provided between the engine and the rear propeller shaft section. It is also an object to rigidly mount opposite ends of the rear propeller shaft section in bearings respectively provided in the case of the transmission and in the case of the differential.

The invention consists of the novel constructions, arrangements and devices to be hereinafter described and claimed for carrying out the above stated objects and such other objects as will be apparent from the following description of a preferred form of the invention illustrated with reference to the accompanying drawings, wherein:

Fig. 1 is a plan view of the chassis of an automotive vehicle embodying the principles of the invention;

Fig. 2 is a sectional view on an enlarged scale taken on line 2—2 of Fig. 1;

Fig. 3 is a partial side view of the vehicle chassis taken from line 3—3 of Fig. 1; and Fig. 4 is a sectional view taken on line 4—4 of Fig. 2.

Like characters of reference designate like parts in the several views.

Referring now to the drawings, the illustrated automotive vehicle chassis shown in Figs. 1 and 3 comprises a pair of opposite side frame members 10 and 11 connected by a plurality of cross frame members 12, 13 and 14. The conventional automobile engine 15 is suitably mounted on the front end of the vehicle chassis, and a transmission and differential assembly 16 is mounted suitably with respect to the cross frame members 12 and 13 at the rear of the vehicle chassis. The assembly 16 includes a multi-ratio drive transmission 17 located at the rear and a differential 18 located ahead of the transmission 17.

The usual rear driving road wheels 19 of the vehicle are disposed on opposite sides of the side frame members 10. Each of the wheels 19 is rotatably disposed in a non-rotatable hub 20, and the hubs 20 on opposite sides are connected by means of a De Dion tube 21. Each of the wheels 19 is driven from the differential 18 by means of an axle 22 which is connected to the respective road wheel 19 by means of a universal joint 23 and is connected to the differential by means of another universal joint 24. Each of the hubs 20 supports one of the side frame members 10 and 11, a spring 25 being disposed between the hub and the side frame member.

The side frame member 10 is connected with the De Dion tube 21 by means of a transverse locating rod 26, and a pair of longitudinal rods 27 and 28 are disposed between the hubs 20 and the side frame members 10 and 11 respectively.

The transmission 17 is located at the rear of the differential 18 and the rear driving road wheels 19 and extends longitudinally of the chassis as shown. A propeller shaft assembly connects the transmission 17 with the engine 15 and comprises two propeller shaft sections 29 and 30. The propeller shaft section 30 extends through and is journalled within the housing 31 of the differential 18, the propeller shaft section 30 being so located within the housing 31 by means of a bearing 32. The propeller shaft section 29 is connected by means of a universal joint 33 with the engine 15 and is connected by means of a second universal joint 34 with the propeller shaft section 30.

The transmission 17 comprises a hydraulic torque converter 35 of conventional construction having a bladed fluid impeller or driving element 36. The impeller 36 is fixed on a sleeve shaft 37, and a gear 38 is splined onto the shaft 37. The propeller shaft section 30 extends into the transmission housing 39 and is journalled therein by means of a bearing 40. The propeller shaft section 30 on its rear end has fixed thereto a gear 41 which is in mesh with the gear 38 for the purpose of driving the impeller 36 from the engine 15.

The transmission 17 may be of conventional construction and may comprise a planetary gear set 42 having a ring gear 43, a sun gear 44, a planet gear 45 in mesh with the ring gear 43 and a planet gear 46 in mesh with both the planet gear 45 and with the sun gear 44. A second sun gear 47 is provided which is in mesh with the planet gear 45. The planet gears 45 and 46 are rotatably mounted on a planet gear carrier 48.

A pair of clutches 49 and 50 are respectively provided for connecting the sun gear 47 or the sun gear 44 with the output shaft 51 of the torque converter 35. Brakes 52 and 53 are respectively provided for the carrier 48 and for the sun gear 47 for completing various power trains through the transmission from the shaft 51 to a transmission output shaft 54. In view of the fact that the transmission gearing does not form a part of the present invention, except only insofar as it completes a driving connection between the shafts 51 and 54, no further details are deemed necessary; however, if a more complete description is desired, the copending application of Robert W. Wayman, Serial No. 166,-136, filed June 5, 1950, may be referred to.

The differential 18 is of conventional construction and may, for example, comprise a pair of beveled gears 55 and 56 respectively splined onto output shafts 57 and 58. The shafts 57 and 58 are connected to the universal joints 24 previously described. A plurality of beveled gears 59 in mesh with gears 55 and 56 are mounted on a carrier 60, and a ring gear 61 is fixed with respect to the carrier 60. The transmission output shaft carries a beveled gear 62 which is in mesh with the ring gear 61 for the purpose of driving the latter and thereby driving the shafts 57 and 58 from the transmission.

Referring to Fig. 4, it will be noted that the shaft section 30 extends through the differential housing 31 at one side of the gears 55, 56 and 59, and although it is not apparent from the showing of Fig. 2 in which the gear 41 and shaft 30 have been rotated out of their actual planes for purposes of illustration, the shaft 30 likewise extends into the housing 39 downwardly and to the side of the shaft 51. As has been noted, the transmisison 17 extends longitudinally of the vehicle chassis, and this is true of the longitudinal shafting in the transmission such as the shafts 51 and 37.

In operation, the engine 15 drives the gear 41 through the universal joints 33 and 34 and the propeller shaft sections 29 and 30. A number of different power trains are completed through the transmission 17 by engagement of different pairs of the clutches and brakes thereof, and all of the drives are through the gears 41 and 38 and the torque converter 35. The output shaft 54 of the transmission drives the road wheels 19 through the differential 18, which functions in the conventional manner, and through the propeller shafts 22 and the universal joints 23 and 24. The transmission and differential assembly is fixed with respect to the vehicle chassis, and the transmission and differential casings 39 and 31 are fixed to each other. The transmission 17 extending rearwardly of the differential 18 being located at the rear of the vehicle instead of in the usual position immediately behind the vehicle engine 15. The tie rods 26, 27, and 28 serve the purpose of holding the road wheels 19 in their proper position with respect to the vehicle chassis.

The transmission 17, as will be observed from Fig. 1 or Fig. 2, is relatively elongated, and it extends lengthwise of the vehicle chassis immediately behind the differential 18. It is thus located out of the way with respect to the passenger compartments of the vehicle, and no transmission hump is required in the floor of the front passenger compartment immediately to the rear of the engine 15. The casings of the transmission 17 and differential 18 are fixed to each other, and thus the same body of lubricant may be used for both the differential and the transmission. It will be noted that the rear propeller shaft section 30 is rigidly mounted with respect to the assembly 17, being journalled by means of the bearings 32 and 40 with respect to it. In order to drive the impeller 36 from a place intermediate the ends of the transmission 17, the constant mesh gears 38 and 41 are utilized, the impeller 36 being provided with the forwardly extending sleeve shaft 37 for the purpose of forming a driving connection between the gear 38 and the impeller 36.

I wish it to be understood that my invention is not to be limited to the specific constructions and arrangements shown and described, except only insofar as the claim may be so limited, and it will be apparent to those skilled in the art that changes may be made without departing from the principles of the invention.

I claim:

In a transmission and differential assembly, a differential having a case and having two driven shafts extending from opposite sides thereof, a transmission comprising a case and having greater length than width and connected at one end to the differential, said transmission comprising a hydrodynamic coupling device at its end remote from said differential and multi-ratio gearing between said coupling device and said differential, a propeller shaft disposed externally of said transmission and extending longitudinally thereof and journalled in the cases of both the transmission and differential, a driving gear in said transmission case coaxially disposed with respect to said hydrodynamic device and disposed between the hydrodynamic device and said gearing, and a second driving gear in said transmission case and in mesh with said first named driving gear and fixed on said propeller shaft for driving the transmission.

References Cited in the file of this patent

UNITED STATES PATENTS

| | | |
|---|---|---|
| 2,211,233 | Kelley | Aug. 13, 1940 |
| 2,435,930 | Schjolin | Feb. 10, 1948 |
| 2,645,299 | Vincent | July 14, 1953 |
| 2,727,409 | Muller et al. | Dec. 20, 1955 |